Oct. 19, 1954  K. H. BURGSMÜLLER  2,691,921
SLANT CUT

Filed Oct. 5, 1951  2 Sheets-Sheet 1

INVENTOR
KARL HEINRICH BURGSMÜLLER
BY James J. Cannon,
ATTORNEY

Oct. 19, 1954 K. H. BURGSMÜLLER 2,691,921
SLANT CUT
Filed Oct. 5, 1951 2 Sheets-Sheet 2
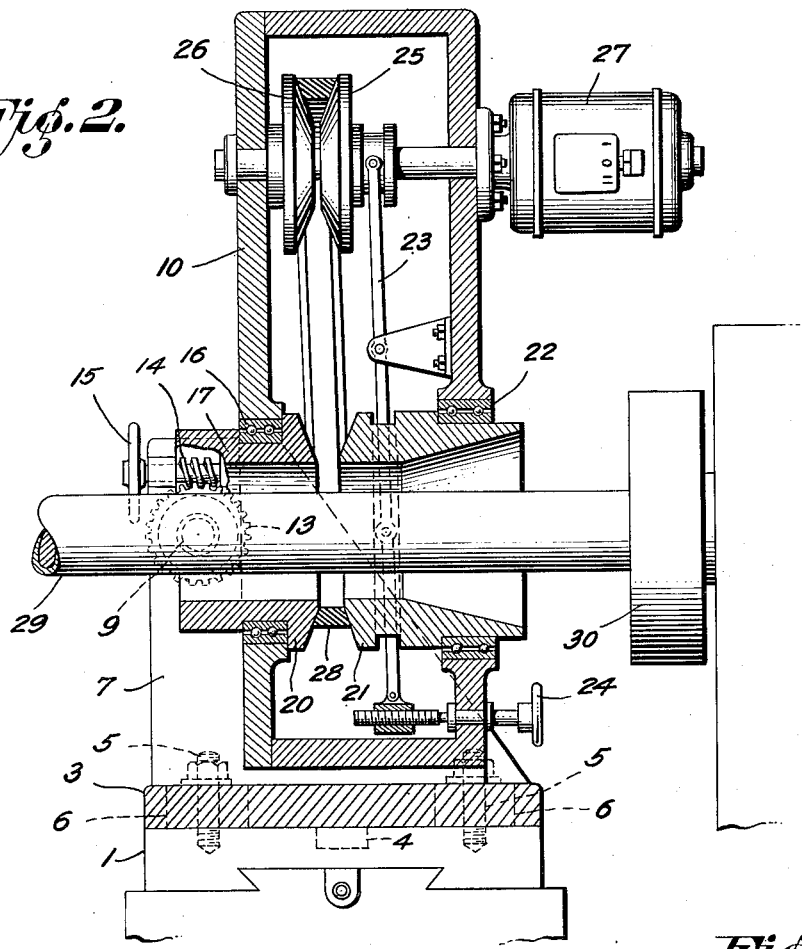
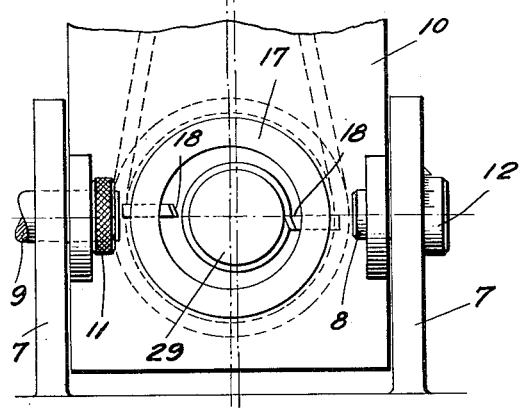
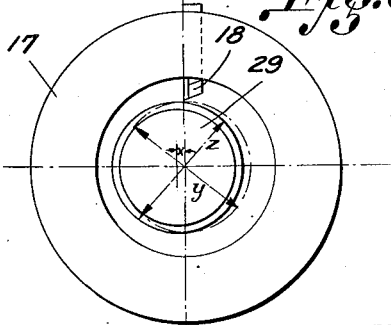
INVENTOR
KARL HEINRICH BURGSMÜLLER
BY James J. Cannon
ATTORNEY Patented Oct. 19, 1954

2,691,921

UNITED STATES PATENT OFFICE 2,691,921

SLANT CUT

Karl Heinrich Burgsmüller, Kreiensen am Harz, Niedersachsen, Germany, assignor to Gomerue Establishment, Vaduz, Liechtenstein Application October 5, 1951, Serial No. 249,920

3 Claims. (Cl. 90—11.64)

This invention relates to certain improvements in or relating to the cutting of threads by means of a cutting tool operating at a slight slant.

Said cutting tool held in a ring, serving as a tool holder, circles eccentrically about a relatively slowly rotating workpiece, said tool makes a short cut with each rotation about said workpiece, which is continued following a relatively long idle path. This invention utilizes the known advantages of the alloy tipped cutting tools, generally known as carbide tools.

In the past it was thought advisable in the cutting of threads, to angularly slant the tool holder ring by one-half, or about one-half, of the angle of the thread, in order to stress one cutting edge only of the tipped tool. The said slanted position of the tool holder ring, however, had the disadvantage of limiting the size of the workpiece for a given size of the tool holder ring. By increasing the diameter of the tool holder ring, a difficult and expensive bearing arrangement must be provided for.

The angle formed between the axis of the workpiece, and the plane formed by the circle described by the rotating tool point, is made equal to the pitch or helix angle of the thread to be cut.

With this new method it is possible, with extremely small displacement angles in the horizontal plane between said axis of rotation of said tool holder ring, and said axis of the workpiece, to perform a single-flank cut, thus permitting the machining of shafts of a larger diameter, than here-to-fore with the same diameter of said tool holder ring.

In the present invention the angle, and/or slant, formed in the horizontal plane through the axis of the workpiece and the vertical plane through the axis of rotation of the tool holder ring, is adjusted so that one flank only of the tool point, which is ground to fit the profile of the thread, is engaged in cutting the thread on the workpiece. In the application of this invention it is preferred to use more than one tipped cutting tool.

The amount of eccentricity between the axis of the tool holder ring and the axis of the workpiece is selected so that the diameter of the circle described by the tool point does not substantially exceed the nominal diameter of the thread to be produced.

It may be advantageous to select the said eccentricity so as to correspond approximately to the depth of the thread, i. e. approximately to the depth of the cut.

Other and further objects, features and advantages of the invention will be pointed out hereinafter and appear in the appended claims forming part of this application.

In the accompanying drawings several now preferred embodiments of the invention are shown by way of illustration and not by way of limitation.

Fig. 2 is a side view thereof, partly in section, Fig. 3 is a diagrammatic view showing the eccentric position of the tool holder ring in relation to the axis of the workpiece.

Fig. 4 is a tool holder ring having two cutting tools arranged in opposite position to each other so as to balance one another.

Similar reference numerals denote similar parts in the different views.

Figure 1:
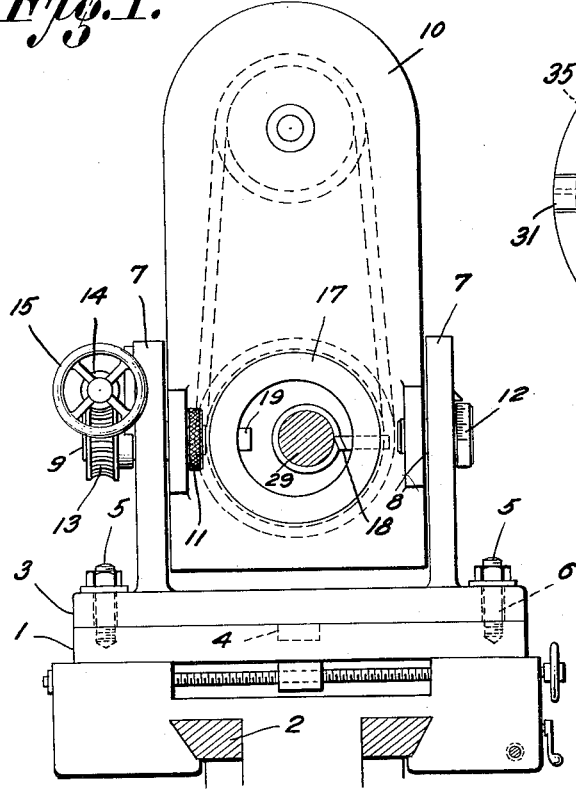
Fig. 1 is a front view of a device for carrying out my novel method, in the form of an attachment to be mounted on the tool rest of a lathe.

Reading on the drawings Figs. 1 and 2, show a base 3, mounted on the tool rest 1, of a standard turning lathe 2, said base 3, can be swivelled about a vertical pivot 4, and fixable in various positions by means of clamping screws 5, which pass through circular slots 6. Said base 3 carries two bearing brackets 7 in which casing 10 is mounted, by means of horizontal pivots 8, 9, which is locked in position by screw 11. Pivot 8 has a scale, or graduation, 12, for adjustment, or reading, of the angle of inclination of the casing 10. Pivot 9 has a worm wheel 13 to engage with a worm 14, mounted on the corresponding bearing bracket 7, and can be driven by hand wheel 15.

Reading on Figs. 1 and 2, the casing 10 carries by means of a ball bearing 16, a tool holder ring 17, having a cutting tool 18, opposite thereto, a balance weight 19. Part of tool holder ring 17, rotating in casing 10, forms one half 20, of an adjustable V-belt sheave serving also as a flywheel to avoid unbalanced stresses upon the bearing 16, of tool holder ring 17, which at the high speed of rotation is subject to heavy loads. The other half 21 of the adjustable V-belt sheave is axially mounted in the casing 17 by means of a ball bearing 22. Said half 21 of V-belt sheave, 20—21 can be shifted in relation to the axially stationary half 20, by a hand wheel 24, through a lever 23. Said lever 23 serves to control the movable half 25 of a second adjustable V-belt sheave 25, 26, said V-belt sheave 25, 26, can be driven by motor 27, mounted on casing 10. The two V-belt sheaves 20, 21 and 25, 26, are connected by a V-belt 28.

In cutting a thread on shaft 29, by my novel method, said shaft 29, is passed through tool holder ring 17, and held in the chuck 30 of the lathe 2, eccentrically thereto.

Tool holder ring 17 with the casing 10, is swivelled about its vertical pivot 4, so that one of the cutting flanks of tool 18, which is ground to fit the thread to be cut, slides past one of the flanks of the thread to be cut, and said tool flank does not perform any cutting work, while the other tool flank performs all the cutting work. This position of the casing 10 is then fixed by the clamping screws 5. Casing 10 is then inclined about its horizontal bearing pivots 8—9, by turning the hand wheel 15 operating the worm gear drive 13—14, until the angle of inclination corresponds with the pitch, or helix angle, of the thread to be cut. Said angle of inclination can be read on scale 12. Workpiece 29, is slowly rotated, while the tool holder ring 17 is rotated at high speed. Said speed can be adjusted by hand wheel 24 through an adjustable v-belt drive 20, 21, 25, 26, and belt 28.

Tool holder ring 17 encircles the workpiece 29 eccentrically. A short cut along one flank, to the full depth, of the thread, will be carried out with each rotation of said tool holder ring 17. The cut will be continued in the following rotation. After each cut the cutting tool 18, is passed through the air at high speed for a relatively long idle path, and thus is cooled very effectively.

Fig. 3 shows tool holder ring 17 with the cutting tool 18 and its eccentricity $x$, in relation to the axis of the workpiece 29, as indicated. The circle of diameter $y$ described by the point of tool 18, should not, or not substantially, exceed the nominal diameter $z$, of the therad to be cut.

Fig. 4 shows two opposite cutting tools 18, arranged in the tool holder ring 17, to balance rotating masses.

Figure 5:
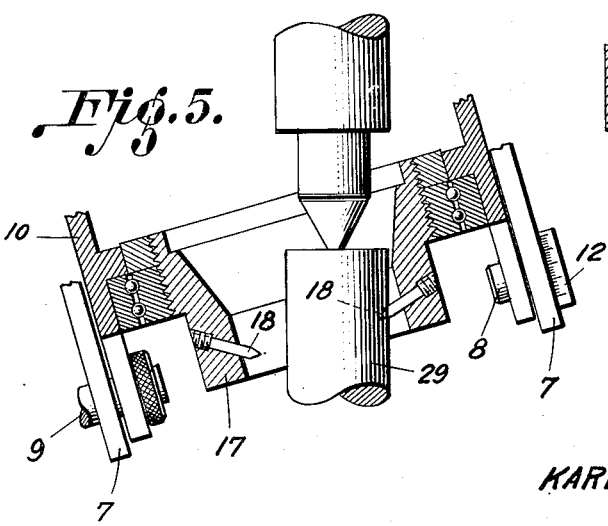
Fig. 5 is a sectional view of a tool holder ring which is slidable in an axial direction in its driving disc, and having two adjustable tools.

Fig. 5 shows tool holder ring 17, consisting of two axially telescoping parts, mounted in the casing 10, for holding cutting tools 18.

By shifting the ring part 17 holding the tools 18 axially the said tools 18, can be adjusted so that the points of said tools 18, are in line with the axis passing through the pivots 8 and 9, so as to ensure a satisfactory cut.

Figure 6:
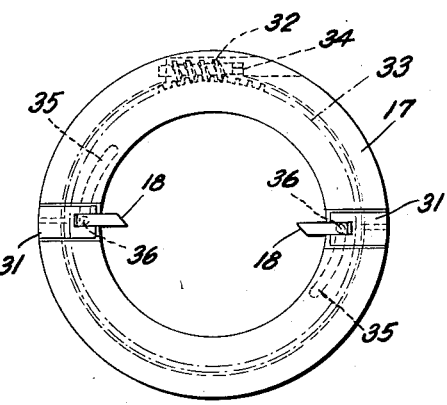
Fig. 6 is an end view of a tool holder ring showing tools adjustable in a radial position.

Fig. 6 shows tool holder ring 17 designed to be used for all workpiece diameters within its scope.

Tools 18 are secured in jaws 31, in a similar manner as in a universal chuck. The tools 18, are adjusted simultaneously and evenly through a self-locking worm gear drive, comprising worm 32 and worm wheel 33, by turning said worm 32 by square head 34 by means of a spanner wrench. Worm wheel 33, is concentrically mounted on the tool holder ring 17, and equipped with spiral shaped grooves 35, to engage guide pins 36, of jaws 31, holding cutting tools 18.

Figure 7:
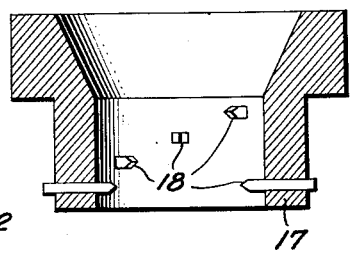
Fig. 7 is a sectional view of a tool holder ring showing a plurality of cutting tools for the making of multiple threads.

Fig. 7 shows tool holder ring 17 with a separate cutting tool 18, for each thread fillet of a multiple thread to be cut.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What I claim is:

1. Apparatus for cutting screw threads on a substantially cylindrical portion of a workpiece, comprising means for supporting a workpiece and for relatively slowly rotating it about the axis of such cylindrical portion, a thread cutting tool, a ring type tool holder for said tool, a casing in which said tool holder is mounted for rotation about the axis of said tool holder, means carried by said casing for rotating said tool holder at a speed which is relatively rapid as compared with the speed of rotation of the workpiece, a base in which said casing is mounted for adjustive movement about an axis perpendicular to a predetermined plane passing through said axis of rotation of said workpiece, means for securing said casing to said base in different adjusted positions about the axis therebetween, a stationary support mounting said base for adjustive movement about an axis which is perpendicular to a second plane, said second plane also passing through said axis of rotation of said workpiece and being perpendicular to the first named plane, and means for securing said base to said stationary support in different relative adjusted positions thereof.

2. Apparatus for cutting screw threads on a substantially cylindrical portion of a workpiece, comprising means for supporting a workpiece and for relatively slowly rotating it about the axis of such cylindrical portion, said axis being substantially horizontally disposed; a stationary support adjacent to said workpiece supporting and rotating means, a base mounted on said stationary support for adjustment in respect thereto about a vertical axis, means for securing said base to said support in different adjusted positions about said axis, a casing pivotally mounted on said base and adjustably movable in respect thereto about a horizontal axis which is fixed in respect to said base, means for securing said casing to said base in different adjusted positions, a ring type tool support mounted on and for rotation with respect to said casing, a thread cutting tool carried by said tool support and directed inwardly thereof, means also carried by said casing for rotating said tool support at a speed which is relatively rapid in respect to the speed of rotation of said workpiece, whereby said tool may be caused to cut intermittently with longer cooling periods alternating with shorter cutting periods, and the angle of said tool in each cut may be adjusted by the adjustment means aforesaid.

3. Apparatus according to claim 2, wherein said tool support rotating means comprises an electric motor mounted on said casing, and a variable speed power transmission means between said motor and said tool support.

References Cited in the file of this patent

UNITED STATES PATENTS

| Number | Name | Date |
|---|---|---|
| 1,507,235 | Hall | Sept. 2, 1924 |
| 1,626,936 | Ingham | May 3, 1927 |
| 1,888,792 | Cottrell | Nov. 22, 1932 |
| 2,610,535 | Johnson | Sept. 16, 1952 |

FOREIGN PATENTS

| Number | Country | Date |
|---|---|---|
| 43,802 | Switzerland | Mar. 23, 1908 |
| 323,813 | Germany | Aug. 9, 1920 |
| 491,956 | France | June 24, 1919 |